United States Patent
Ayoub et al.

(10) Patent No.: US 8,913,188 B2
(45) Date of Patent: Dec. 16, 2014

(54) CLOSED CAPTION TRANSLATION APPARATUS AND METHOD OF TRANSLATING CLOSED CAPTIONING

(75) Inventors: Daniel B. Ayoub, San Jose, CA (US); Chin-Ju Chen, Cerritos, CA (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 12/269,592

(22) Filed: Nov. 12, 2008

(65) Prior Publication Data

US 2010/0118189 A1 May 13, 2010

(51) Int. Cl.
| | |
|---|---|
| *H04N 7/00* | (2011.01) |
| *G06F 17/28* | (2006.01) |
| *H04N 21/435* | (2011.01) |
| *H04N 21/488* | (2011.01) |
| *H04N 21/485* | (2011.01) |
| *H04N 5/445* | (2011.01) |
| *H04N 7/088* | (2006.01) |

(52) U.S. Cl.
CPC .......... *G06F 17/289* (2013.01); *H04N 21/4355* (2013.01); *H04N 21/4884* (2013.01); *H04N 7/0885* (2013.01); *H04N 21/4856* (2013.01); *H04N 5/44513* (2013.01)
USPC .......................................... 348/468; 704/277

(58) Field of Classification Search
USPC ............................ 348/460–468; 725/135–139
See application file for complete search history.

(56) References Cited

U.S. PATENT DOCUMENTS

| | | | | |
|---|---|---|---|---|
| 5,519,443 | A * | 5/1996 | Salomon et al. | 348/467 |
| 7,191,117 | B2 * | 3/2007 | Kirby et al. | 704/9 |
| 7,366,671 | B2 * | 4/2008 | Xu et al. | 704/270 |
| 8,112,783 | B2 * | 2/2012 | Lim et al. | 725/136 |
| 2005/0086702 | A1 * | 4/2005 | Cormack et al. | 725/135 |
| 2006/0034589 | A1 * | 2/2006 | Ahn et al. | 386/95 |
| 2008/0066138 | A1 * | 3/2008 | Bishop et al. | 725/137 |
| 2010/0191533 | A1 * | 7/2010 | Toiyama et al. | 704/260 |

OTHER PUBLICATIONS

Sanghwa Yuh, Kongjoo Lee, and Jungyun Seo, "Multilingual Closed Caption Translation System for Digital Television," IEICE Transactions on Information and Systems, vol. E89-D, No. 6, Abstract (2 pgs.), http://ietisy.oxfordjournals.org/cgi/reprint/E89-D/6/1885.

Polycom, Inc., "Real-time Closed Captioning in Video Conferences," © 2004, 4 pgs., http://www.polycom.com/common/pw_cmp_updateDocKeywords/0,1687,3229,00.pdf.

Polycom, "Investor Relations—Everything you need to know about the leader in collaboration solutions," 2 pgs., http://www.polycom.com/investor_relations.

(Continued)

*Primary Examiner* — Jefferey Harold
*Assistant Examiner* — Humam Satti
(74) *Attorney, Agent, or Firm* — Patent Capital Group

(57) ABSTRACT

In one embodiment, a method is provided that includes receiving a transmitted combined video and closed caption (CC) signal. The combined signal is separated into a CC signal and a video signal. The CC signal is converted into an original CC text stream. The method also includes translating the original CC text stream from a first language into a second language to from a translated CC text stream. In more specific embodiments, the method includes inserting each translated CC text stream into the video signal. The translated CC text can appear instead of the original CC text when the video signal is displayed.

20 Claims, 3 Drawing Sheets

(56) References Cited

OTHER PUBLICATIONS

Fred Popowich, Paul McFetridge, Davide Turcato, and Janine Toole, "Machine Translation of Closed Captions," © 2001 Kluwer Academic Publishers, Abstract (1 pg.), http://www.springerlink.com/content/g3w6u07o16x34v23.

Kluwer Academic Publishers, "Machine Translation of Closed Captions," The Guide to Computing Literature, vol. 15, Issue 4 (Dec. 2000), ISSN: 0922-6567, Abstract (1 pg.), http://portal.acm.org/citation.cfm?id=593198.

Fred Popowich, Paul McFetridge, Davide Turcato, and Janine Toole, IngentaConnect, "Machine Translation of Closed Captions," Abstract (1 pg.), http://www.ingentaconnect.com/content/klu/coat/2000/00000015/00000004/00352347#search=%22machine%20translation%20closed%20caption%20%22.

Davide Turcato, Janine Toole, Paul McFetridge, and Fred Popowich, Natural Language Lab, Simon Fraser University, "Machine Translation of Closed Captions," Abstract (1 pg.), http://natlang.cs.sfu.ca/researchProject.php?s=82.

* cited by examiner

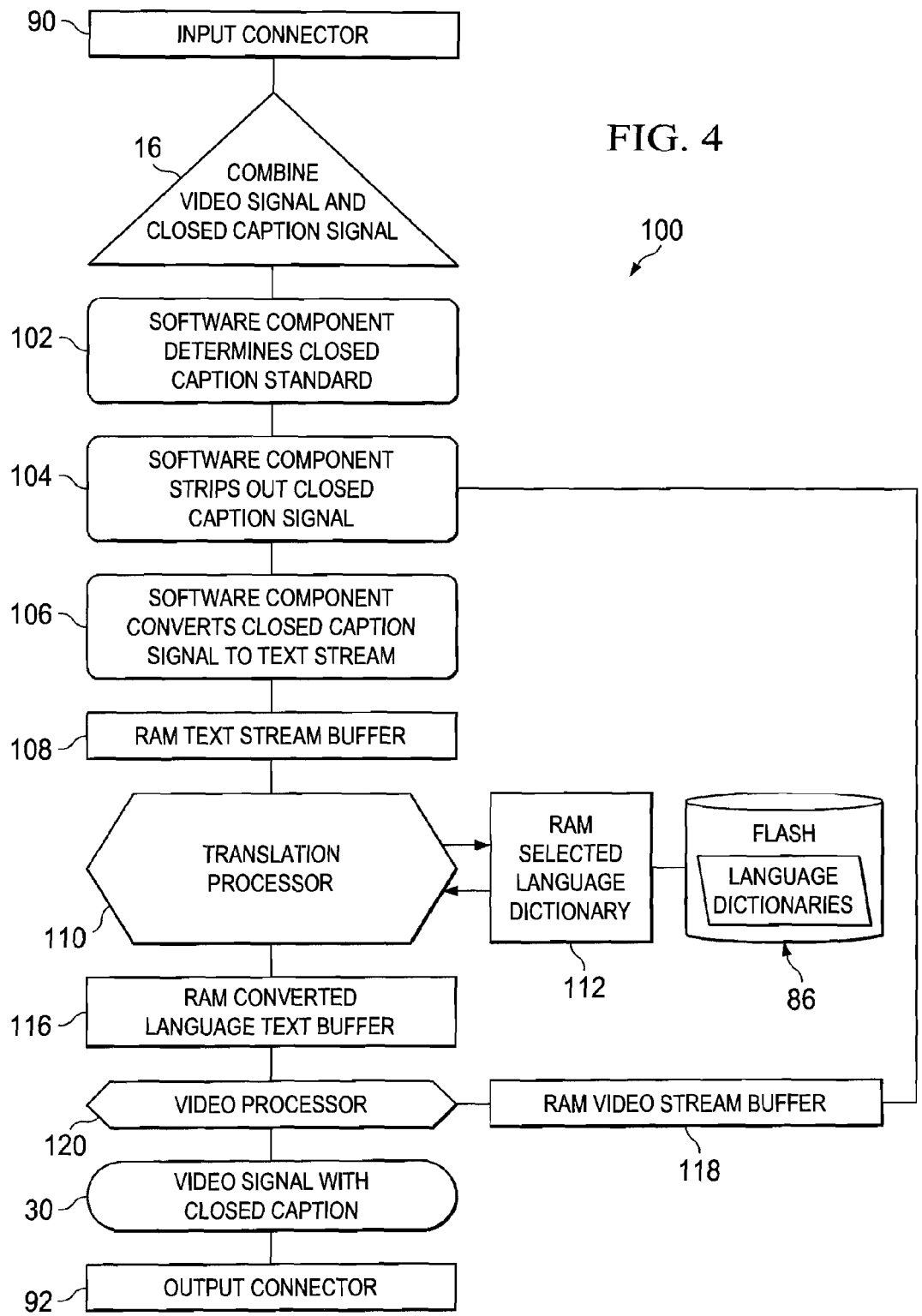

CLOSED CAPTION TRANSLATION APPARATUS AND METHOD OF TRANSLATING CLOSED CAPTIONING

TECHNICAL FIELD OF THE INVENTION

This invention relates in general to the field of communications and, more particularly, to a system and a method for the translation of closed caption text from one language to another.

BACKGROUND OF THE INVENTION

Closed captions can refer to subtitles, or other text that can accompany a data flow. Closed captions can also refer to the corresponding text that can be mapped to audio or video data. The text can be presented in a number of ways, such as by insertion of text in a video image, overlaying the text on a video image, via 'teletext', or in other suitable forms. Closed captions can be used in environments where the volume has been muted [for whatever reason], or used to assist the hearing impaired by displaying text words that, for example, are spoken on an audio track accompanying the video. Closed captions can also be used to provide a text transcript in one language of words spoken in another language. Transmissions with closed captions usually display a closed caption (CC) symbol to indicate closed captions are available.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 4 is a simplified block diagram of an embodiment of a closed caption translation apparatus in accordance with yet another embodiment of the present invention.

DETAILED DESCRIPTION OF EXAMPLE EMBODIMENTS OF THE INVENTION

Overview

In one embodiment, a method is provided that includes receiving a transmitted combined video and closed caption (CC) signal. The combined signal is separated into a CC signal and a video signal. The CC signal is converted into an original CC text stream. The method also includes translating the original CC text stream from a first language into a second language to from a translated CC text stream. In more specific embodiments, the method includes inserting each translated CC text stream into the video signal. The translated CC text can appear instead of the original CC text when the video signal is displayed.

For the purposes of this disclosure, subtitles and closed captions are regarded as the same and are not intended to be limited only to hearing impaired applications, but are applicable to other scenarios in which text is being used be the audience (e.g., to assist in understanding or following a given audio or video flow, or in translating from one language to another, etc.).

Figure 1:
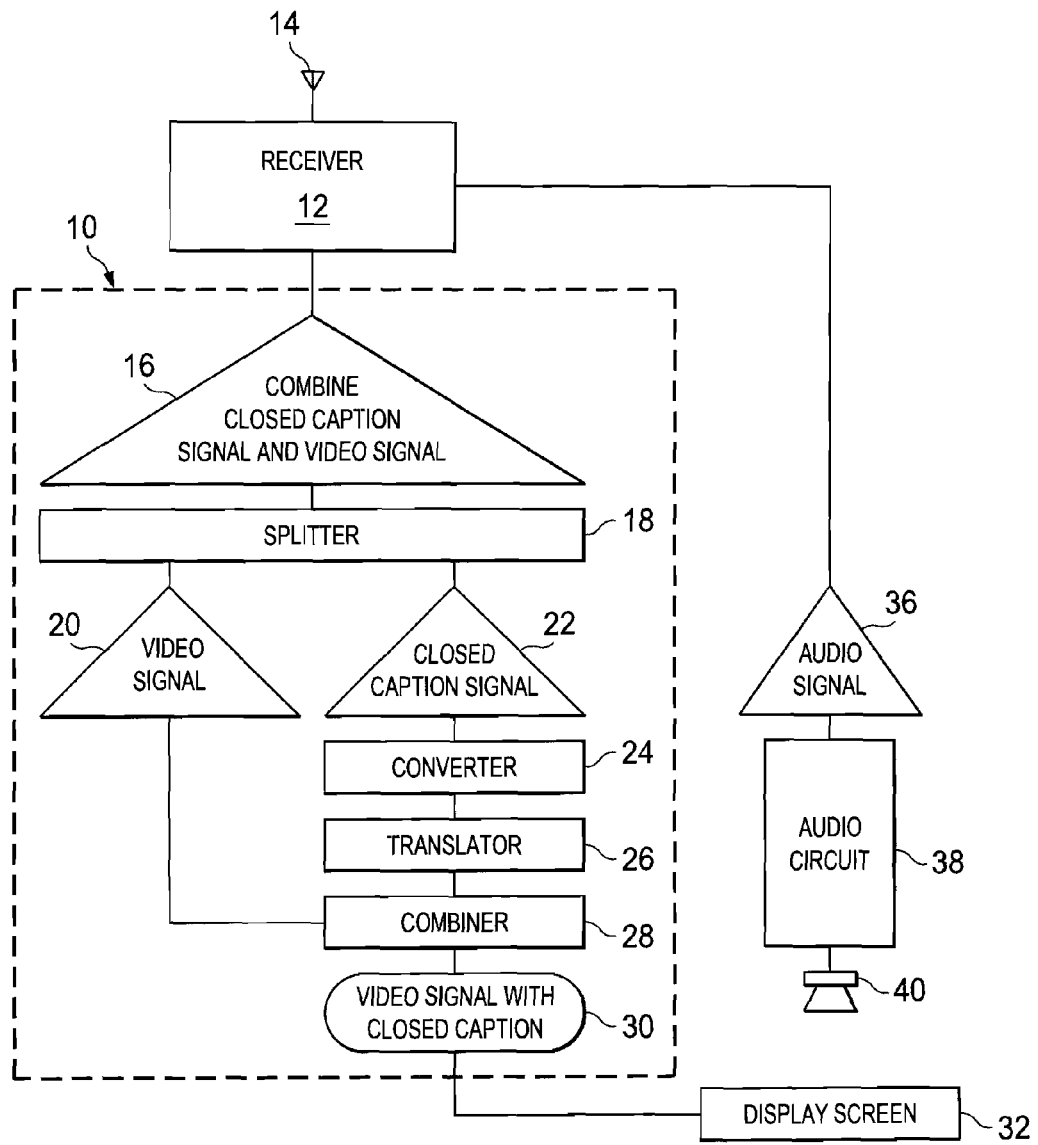
FIG. 1 is a simplified block diagram of an embodiment of a closed caption translation apparatus in accordance with one embodiment of the present invention.
Figure 2:
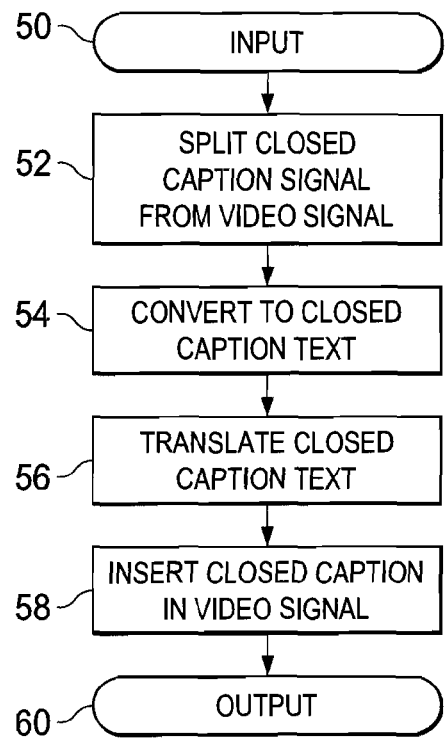
FIG. 2 is a simplified flowchart illustrating a series of example steps associated with the apparatus.

Referring to FIG. 1, an example is illustrated for an embodiment of a closed caption (CC) translation apparatus 10. Translation apparatus 10 can be arranged to perform a method of translation of CC text as shown in FIG. 2. Translation apparatus 10 may be a standalone unit similar to a 'set-top-box' or it can be built into (embedded in) a video signal display control device such as a television set, a tuner, a digital video recorder (DVR), a gateway, a server, a set-top-box or other device. In other embodiments, translation apparatus 10 is configured with software, which can potentially access a processor and/or a memory for carrying out one or more activities, as outlined herein in this Specification. Translation apparatus 10 can include a splitter 18, a converter 24, and a translator 26. In one example embodiment, the apparatus also comprises a combiner 28.

Translation apparatus 10 can be connected to a receiver 12. Receiver 12 can include an antenna 14 for receiving a transmitted signal, such as a broadcast television signal. In one embodiment, receiver 12 is a set-top-box or a receiver and tuner circuit of a television set. The transmitted signal can include a combined CC signal and a video signal 16. Typically, the transmitted signal will also have an audio signal 36. Combined signal 16 is, for example, as described in the EIA-608 standard in the case of an analog transmission, or encoded as MPEG2 data as described in the EIA-708 and ATSC A/53 standards. Combined signal 16 may be in accordance with other standards and formats, or as otherwise desired. Receiver 12 can be configured to demodulate the combined signal or decode combined signal 16 from the transmitted signal using any suitable techniques. The resulting combined CC signal and video signal 16 can be output from receiver 12 and input 50 to translation apparatus 10.

In the case of translation, where apparatus 10 is embedded in another device, combined signal 16 may be provided directly to splitter 16 by an electrical software logical link or a hardware connection: for example, such as a wire or an electrically conductive track of a printed circuit board (PCB). In an alternative embodiment, where apparatus 10 is a standalone device, receiver 12 is, for example, connected to apparatus 10 by respective sockets and an electrical cable with corresponding plugs at each end, which connect the sockets together so that splitter 18 receives combined signal 16 from receiver 12. Other forms of interconnection may also be used, such as optical coupling, computer code connections in which software interfaces with other software or hardware, etc.

Once combined signal 16 is input 50 to splitter 18, splitter 18 separates (or splits 52) combined signal 16 into a video signal 20 and a CC signal 22. CC signal 22 can have a stream of text encoded therein. Converter 24 takes CC signal 22, and converts 54 it into an original CC text stream. Converter 24 provides the CC text stream to translator 26. Translator 26 translates the original CC text stream from its original language into a second language, thereby forming a translated CC text stream. One example translation process 56 is described further below.

In one embodiment, the translated CC text stream may be output or displayed separately. In an embodiment, combiner 28 then includes 58 the translated CC text stream in video signal 20 to produce a video signal 30. Video signal 30 is then output 60 for display of the video signal, along with the translated CC text in the second language (e.g., on display screen 32). The connection from combiner 28 to video display screen 32 may be a PCB track for an embedded device or by an electrical cable, software interface, optical coupling, etc. for a standalone device.

In one embodiment, splitter 18 is an electronic circuit that demodulates the combined signals. Other embodiments of splitter 18 include software mediums. A suitable electronic circuit for use as splitter 18 is a splitting circuit used in television sets to demodulate the transmitted signal into a video signal and a CC signal in NTSC or PAL CC capable television sets. Other suitable splitter electronic circuits may be used with alternative hardware arrangements.

In another embodiment, splitter 18 is a processor controlled by logic, such as firmware or a software computer program component, where the processor is configured to remove the CC signal from the video signal. Suitable logic is that used in digital television receivers for a similar purpose. In an embodiment, converter 24 is a processor controlled by logic, such as firmware or a software computer program component, where the processor is configured to convert the encoded signal into a text stream. Typically, the text stream will be represented digitally.

In one embodiment, the combiner 28 is a processor controlled by logic, such as firmware or a software computer program component, where the processor is configured to combine the video stream with translated CC text stream by converting the translated CC text stream into a translated CC text signal and then modulating/encoding the translated CC text signal with the video signal.

In one example embodiment, where the device is integrated into a television set, receiver 12 also decodes an audio signal 36 from the transmitted signal, which is provided to an audio output circuit 38 for driving a speaker 40. Before turning to FIG. 2, which offers a method to be potentially implemented by apparatus 10, a brief description is offered for some of the components that may cooperate to achieve some, but not all, of the operations of example embodiments of the invention.

Figure 3:
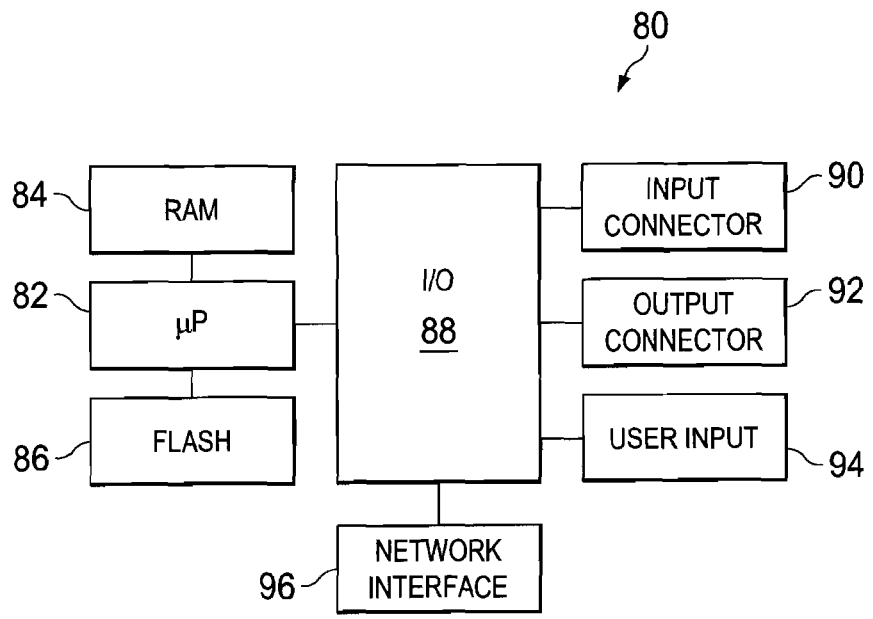
FIG. 3 is a simplified block diagram of another embodiment of a closed caption translation apparatus in accordance with one embodiment of the present invention.

FIG. 3 shows a closed caption translation device 80 including components that can be configured to operate as a closed caption translation apparatus. Device 80 can include a processor 82, random access memory (RAM) 84, flash memory 86, I/O device 88, input connection 90, output connection 92, a user input 94, and network interface 96. Processor 82 may be of any suitable type, such as those used in a personal computer. Alternatively, processor 82 may be specifically designed for translation of text from one language to another. Processor 82 accesses memory in the form of RAM 84 and non-volatile flash memory 86. RAM 84 can be used for buffering, as described below, and/or as "work-space" for performing translations. Flash memory 86 can store information that is used to perform the translation, as well as information for converting the text into a video image. I/O device 88 is an interface between processor 82 and input connection 90, output connection 92, user input 94, and network interface 96.

Referring now to FIG. 4, apparatus 100 may include processor 82 controlled by logic such as a computer program stored in flash memory 86 or in a read only memory (ROM). The computer program can be loaded into RAM 84 for execution and comprise software component 102, software component 104, and/or software component 106. In one example embodiment, processor 82 is controlled to operate a plurality of threads each of which enable processor 82 to operate, as if the thread were a processor dedicated to a separate function.

Apparatus 100 receives a combined video signal and CC signal 16 from a source via input connection 90. The source may be receiver 12 of FIG. 1. Software component 102 can control processor 82 to determine which CC standard is being used by the CC signal. Software component 104 can control processor 82 to strip out (split) the CC signal from the video signal. Software component 106 controls processor 82 to convert the CC signal into text.

The text is then provided to a RAM buffer 108, which buffers the text for translation by a translation processor 110. Translation processor 110 may be a dedicated processor, or a dedicated software thread running on processor 82. Translation processor 110 can be controlled to take portions of the buffered CC text in RAM buffer 108 and translate each portion from its original language (for example English) into the second selected language. Each portion of translated text is buffered in RAM buffer 116. Buffering the translated portions allows them to be streamed out of RAM buffer 116 as a translated CC text stream, which is provided to video processor 120. Video processor 120 may be a dedicated processor, or a dedicated software thread of processor 82.

The stripped video signal from component 104 can be buffered in RAM buffer 118. This can delay the video stream long enough for the translation to occur. The buffered video signal is then input to video processor 120. The video processor 120 combines the buffered video signal with the translated CC text stream to produce output 30, a video signal, which includes the translated CC text. Output 30 is provided to output connection 92.

Translation processor 110 undertakes the translation according to a translation dictionary loaded into RAM portion 112. RAM portion 112 can be a part of RAM 84. RAM portion 112 is also used as a "work-space" for performing the translation. In one embodiment, translation processor 110 is controlled to lookup each portion, or elements of each portion, in the translation dictionary stored in RAM portion 112. In one example embodiment, the translation dictionary is selected by a user from a plurality of translation dictionaries stored in a suitable storage element, such as flash memory 86. The second language may, therefore, be any one of many language dictionaries stored in flash memory 86. In one example embodiment, the translation dictionaries may be of the type used in machine translation of text from one language to another.

In one example embodiment, RAM buffer 108, RAM buffer 116, and RAM portion 112 operate with translation processor 110 as a dedicated processing unit such that the processing unit is arranged to separate the original CC text stream into portions, translate each portion of the original CC text stream into a corresponding translated CC text portion, and join the corresponding translated CC text portions together to form the translated CC text stream. If processor 82 has sufficient cache, RAM buffer 108, RAM buffer 116, and RAM portion 112 may form a cache. Separate RAM 84 may be unnecessary for this purpose.

In one example embodiment, RAM buffer 116 allows the translation unit to continuously join the corresponding translated CC text portions together, as they are translated to form the translated CC text stream. In one example embodiment, the translation unit determines one or more elements in the second language to substitute for each original CC text portion to form each translated CC text portion. In one example embodiment, each element is a word. In one example embodiment, each portion is a sentence or a phrase. In an alternative embodiment, each portion is a word. In one example embodiment, RAM portion 112 stores a set of translation rules for determining how to substitute the one or more elements with each original CC text portion to form each translated CC text portion.

In one example embodiment, flash memory 86 stores a plurality of selectable sets of translation rules with the translation dictionaries. In one example embodiment, translation apparatus 100 includes user input 94 for selection of the second language. In one example embodiment, the selection of the second language determines which one or both of the translation dictionaries, and the set of translation rules that are used.

RAM buffer 118 and the RAM buffer 116 can be accessed by video processor 120 such that the timing of insertion of the translated CC text stream into the video signal produces substantially real time translation of the original CC text into the translated CC text. Control of the timing is by timing the delay of the video signal and possibly other signals/text streams in the buffers so that when the video is displayed, the translated CC text is [substantially] correctly synchronized.

Control of the timing may also involve control of the length of time of display of the text on the screen. In particular, where the text scrolls across the screen, this may involve controlling the speed of the scrolling. Alternatively, if the text appears for a period and is then deleted and replaced with the next part of the text, then this may involve controlling the length of time that the text is displayed before it is deleted and replaced with the next part of the text. This control can be implemented by video processor 120, or other suitable components.

For example, if a portion of the text in the first language is five words, but after translation, it is six words, then to display the same text portion in the same time by scrolling, the scroll speed could be $6/5^{th}$s of the scroll speed of the text in the first language. If however the translation is four words, then the speed could be $4/5^{th}$s of the original speed. Video processor 120 may apply gradual speed changes or speed averaging to not make a change in the scroll speed too obvious to a viewer. Similar timing changes to the appearance time of text parts can occur if the text appears for a few seconds and is replaced, rather than scrolling. Other formatting implementations may also be possible.

In one example embodiment, translation apparatus 100 comprises a data communicator, such as network interface 96 for loading and storing one or more of the translation dictionary, the selectable translation dictionaries, the translation rules, and the selectable sets of translation rules in flash memory 86. Further, the data communicator may be used to upload software/firmware upgrades to apparatus 100.

Referring back now to FIG. 2, the method shown therein can be described in more detail in relation to apparatus 100 of FIG. 4. Prior to transmission of the transmitted signal, text of the closed caption is integrated into the video feed (or recording) at the head end and broadcast as part of MPEG2 user data, as per the appropriate standard, such as EIA-708 and ATSC A/53 specifications, for example.

The following example represents one definition of a MPEG2 user data frame, which contains the captioning information:

```
User data( ){
    User_data_start_code
    ATSC_identifier
    User_data_type_code
    If (user_data_type code == 0x03
        cc_data( )
    else if (user_data_type_code == 0x06
        bar_data( )
    else {
        while (nextbits( )!= 000 0000 0000 0000 0000 0001
            ATSC_reserved_user data
        }
        Next_start_code( )
}
```

The received transmitted signal is input 50 to input connection 90. Splitting step 52 involves the software component 102 identifying the CC signal by verifying that the user_data_type_code is set to a value of 0x03 in the transmitted MPEG2 user data stream as defined in the ATSC Digital Television Standard (A/53).

The following is a definition of a captioning user data packet:

```
cc_data_pkt
    marker_bits
    cc_valid
    cc_type
    cc_data_1
    cc_data_2
```

Software component 102 can next identify the type of encoding in which the CC signal is being broadcast by checking the value of cc_type within the cc_data_pkt. If the cc_type has a value of 0 or 1, the closed caption signal can be encoded via EIA-608 and can be decoded accordingly. If the cc_type has a value of two or three, the signal is encoded via EIA-708. The two or three values denote an assembly order.

Conversion 54 to CC text by software component 106 can then commence. As the conversion occurs, video processor 120 will buffer the live video feed to RAM buffer 118. The total buffer size can be determined by the total time required to perform translation and video generation. As the video stream is buffered to RAM buffer 118, a 'Buffer ID' can be attached to each text portion for future synchronization.

The CC text signal is decoded into binary digits. Each character in the broadcast language maps to one of these binary digits. EIA-708 and EIA-608 have their own unique values for these mappings. Software component 106 can assemble the binary stream into the broadcast language, for example English, by comparing and replacing values from the appropriate table. At this point, the CC signal has been converted into text.

Translation 56 commences by the text stream being buffered in RAM buffer 108. As text is transferred to RAM buffer 108, translation processor 110 checks and flags grammatical punctuation. After each question mark, exclamation point, period, comma, etc., translation processor 110 can insert a marker. Each sentence can be given a separate reference value. The purpose of this reference value is for marking the end of a sentence, phrases, or other word groups. The reference value can be used to determine the speed of the translated text display and end of line feeds.

Buffered text is taken from RAM buffer 108 in chunks by processor 110. Each chunk is a portion of the text. A portion may be a sentence, a phrase, or a word depending on factors such as the processor power, the RAM size, the translation dictionary and the rules of the translation. Translation processor 110 reads each text portion (typically one by one) and performs a language translation based upon whatever language dictionary/library has been loaded onto RAM portion 112. The 'Buffer ID' should be preserved during this process.

As each portion is translated, it is put into RAM buffer 116. RAM buffer 116 then streams the translated CC text to video processor 120, which generates a video stream of the translated text. Alternatively, translation processor 110 can generate the video stream of the translated text, which is buffered in RAM buffer 116. This video stream is based on the font and character sets defined within FLASH memory 86. The 'Buffer ID' can be preserved during this process. In the insertion step 58, video processor 120 over-lays the translated CC text video stream on the buffered video feed from RAM buffer 118 based upon the value stored in the 'Buffer ID'.

At step 60, the finished video signal can be outputted to output connection 92 so that it can be displayed on, for example, a television set or monitor with the translated closed captioning. A user has the ability to change the displayed closed captioning language or disable the feature via a built-in menu selection via user input 94. In one example embodiment, RAM 112 is dynamically updated in real-time, e.g., via network interface 96, to increase universal word space descriptor and translation accuracy.

The present embodiment allows CC text to be translated into a language of choice on the fly so that CC text is displayed in the chosen language instead of in the transmitted language. One embodiment can leverage existing standards and infrastructure with no changes necessary at the head end, while other configurations of embodiments of the present invention may include proprietary items, or combinations of these two categories.

The language need not be limited to Latin characters because the characters of the selected language can be encoded in the output video signal. For example languages such as English, Italian, Spanish, and French, which use Latin characters, can be chosen. Additionally languages such as Arabic, Hebrew, Hindi, and Chinese, with non-Latin characters can also be displayed.

Note that apparatus 10 and apparatus 100 can be part of set-top box infrastructure, or provided in other components, such as in a switch, a gateway, a communication bridge, a modem, a digital video recorder (DVR), a server, a tuner, a television (inclusive of high-definition models), a personal computer, a personal digital assistant (PDA), a laptop, a satellite component, a domestic controller of some type that can dictate certain operations within a given building, an external standalone device, a software program that achieves the operations discussed herein, or any other suitable device, component, element, or object operable to perform the activities discussed in this Specification.

Moreover, apparatus 10 and 100 may include any suitable hardware, software, components, modules, interfaces, or objects that facilitate the operations thereof. This may be inclusive of appropriate algorithms and communication protocols that allow for an effective exchange of data or information.

In one example implementation, apparatus 10 and 100 include software and/or hardware to achieve the closed captioning operations, as outlined herein in this document. In other embodiments, this feature may be provided external to these elements or included in some other device to achieve this intended functionality.

Each of apparatus 10 and 100 can also include suitable memory elements for storing information to be used in achieving the closed captioning operations as outlined herein. Additionally, each of these items may include a processor that can execute software or an algorithm to perform the closed captioning activities as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the examples provided herein, interaction may be described in terms of two, three, or four elements. However, this has been done for purposes of clarity and example only. In certain cases, it may be easier to describe one or more of the functionalities of a given set of flows by only referencing a limited number of network elements. It should be appreciated that apparatus 10 and 100 (and their teachings) are readily scalable and can accommodate a large number of components, as well as more complicated or sophisticated arrangements and configurations. Accordingly, the examples provided should not limit the scope or inhibit the broad teachings of these concepts, as potentially applied to a myriad of other architectures.

It is also important to note that the steps described with reference to FIGS. 1-4 illustrate only some of the possible scenarios that may be executed by, or within, apparatus 10 and 100. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by apparatus 10 and 100 in that any suitable arrangements, chronologies, configurations, and timing mechanisms may be provided without departing from the teachings of the present invention. While certain hardware and/or software have been identified (e.g., a RAM, a ROM, a standard for assisting in the conversion or propagation of data), this has only been done in an effort to offer simply one, of potentially countless arrangements for apparatus 10 and apparatus 100. In no way should such examples be construed as limiting or confining, as the present invention contemplates any number of possible alternatives and permutations to these proffered examples.

Numerous other changes, substitutions, variations, alterations, and modifications may be ascertained to one skilled in the art and it can be intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a signal receiver for receiving a combined video and closed caption (CC) signal, wherein the combined signal is separated into a CC signal and a video signal, and wherein the CC signal is converted into an original CC text stream; and
a translator for translating the original CC text stream from a first language into a second language to form a translated CC text stream having multiple text portions, wherein each text portion includes a buffer identifier that allows for synchronization of each text portion with the video signal, and wherein a scrolling speed of the text portion is adjusted based, at least in part, on a ratio of an amount of words in the original CC text stream and an amount of words in the translated CC text stream such that a time to display the translated CC text stream is the same as the time to display the original CC text stream.

2. The apparatus of claim 1, further comprising:
a combiner for inserting the translated CC text stream into the video signal.

3. The apparatus of claim 2, wherein the translated CC text stream appears instead of the original CC text when the video signal is displayed.

4. The apparatus of claim 1, wherein the translator is arranged to partition the original CC text stream into portions, translate each portion of the original CC text stream into a corresponding translated CC text portion, and join the corresponding translated CC text portions together to form the translated CC text stream.

5. The apparatus of claim 1, further comprising a memory for storing a translation dictionary for use by the translator to determine one or more text elements in the second language to substitute for each original CC text portion to form each translated CC text portion.

6. The apparatus of claim 5, further comprising a memory for storing a set of translation rules for determining how to substitute the one or more text elements with each original CC text portion to form each translated CC text portion.

7. The apparatus of claim 1, wherein the combiner is configured such that insertion of the translated CC text stream into the video signal produces substantially real time translation of the original CC text into the translated CC text.

8. A method, comprising:
receiving a transmitted combined video and closed caption (CC) signal, wherein the combined signal is separated into a CC signal and a video signal, and wherein the CC signal is converted into an original CC text stream;
storing the original CC text stream in a first buffer; and
translating the original CC text stream from a first language into a second language to form a translated CC text stream having multiple text portions, wherein each text portion includes a buffer identifier that allows for synchronization of each text portion with the video signal, and wherein a scrolling speed of the text portion is adjusted using gradual speed changes based, at least in part, on a ratio of an amount of words in the original CC text stream and an amount of words in the translated CC text stream such that a time to display the translated CC text stream is the same as the time to display the original CC text stream.

9. The method of claim 8, wherein the translated CC text appears instead of the original CC text when the video signal is displayed.

10. The method of claim 8, wherein translation of the original CC text stream into the translated CC text stream comprises:
partitioning the original CC text stream into portions;
translating each original CC text stream portion from the first language into the second language to form a corresponding translated CC text portion; and
joining the corresponding translated CC text portions together to form the translated CC text stream.

11. The method of claim 8, wherein translation of original CC text stream portions is performed by looking up the translated CC text portion or one or more text elements of the translated CC text portion in a translation dictionary to find a corresponding translated CC text portion or one or more text elements of the translated CC text portion.

12. The method of claim 8, wherein translation is performed by substitution of the CC text portion or one or more text elements of the CC text portion with the translated CC text portion or one or more text elements of the translated CC text portion according to a set of translation rules.

13. A system, comprising:
means for receiving a transmitted combined video and closed caption (CC) signal, wherein the combined signal is separated into a CC signal and a video signal, and wherein the CC signal is converted into an original CC text stream;
means for storing the original CC text stream in a first buffer; and
means for translating the original CC text stream from a first language into a second language to form a translated CC text stream having multiple text portions, wherein each text portion includes a buffer identifier that allows for synchronization of each text portion with the video signal, and wherein each text portion includes a timing control to control a length of time the text portion is displayed when the video signal is displayed, wherein the length of time the text portion is displayed is dynamically adjusted using gradual speed changes based, at least in part, on a ratio of an amount of words in the original CC text stream and an amount of words in the translated CC text stream such that a time to display the translated CC text stream is the same as the time to display the original CC text stream.

14. The system of claim 13, further comprising:
means for inserting the translated CC text stream into the video signal.

15. Logic encoded in one or more tangible media for execution and when executed by a processor operable to:
receive a transmitted combined video and closed caption (CC) signal, wherein the combined signal is separated into a CC signal and a video signal, and wherein the CC signal is converted into an original CC text stream;
store the original CC text stream in a first buffer;
translate the original CC text stream from a first language into a second language to form a translated CC text stream having multiple text portions, wherein each text portion includes a buffer identifier that allows for synchronization of each text portion with the video signal, and wherein each text portion includes a timing control to control a length of time the text portion is displayed when the video signal is displayed, wherein the length of time the text portion is displayed is dynamically adjusted based, at least in part, on a ratio of an amount of words in the original CC text stream and an amount of words in the translated CC text stream such that a time to display the translated CC text stream is the same as the time to display the original CC text stream;
store the translated CC text stream in a second buffer; and
store the video signal in a third buffer while the original CC text stream is translated from the first language into the second language.

16. The logic of claim 15, wherein the logic is further operable to:
insert each translated CC text stream into the video signal, wherein the translated CC text appears instead of the original CC text when the video signal is displayed.

17. The apparatus of claim 1, wherein the translator uses a translation dictionary selected by a user from a plurality of translation dictionaries.

18. The apparatus of claim 1, wherein the scrolling speed of the text portion is dynamically adjusted based, at least in part, on the ratio of an amount of words in the original CC text stream and the amount of words in the translated CC text stream.

19. The apparatus of claim 1, wherein the scrolling speed of the text portion is dynamically adjusted using gradual speed changes or speed averaging based, at least in part, on the ratio of an amount of words in the original CC text stream and the amount of words in the translated CC text stream.

20. The apparatus of claim 1, wherein each text portion includes a timing control to control a length of time the text portion is displayed when the video signal is displayed.

\* \* \* \* \*